March 19, 1968  J. A. SCHIPPER  3,374,011

ADJUSTABLE FARM IMPLEMENT TONGUE

Filed Feb. 4, 1966

JOHN A. SCHIPPER
INVENTOR.

BY

United States Patent Office 3,374,011
Patented Mar. 19, 1968

3,374,011
ADJUSTABLE FARM IMPLEMENT TONGUE
John A. Schipper, Aplington, Iowa 50604
Filed Feb. 4, 1966, Ser. No. 525,064
1 Claim. (Cl. 280—478)

ABSTRACT OF THE DISCLOSURE

A telescoping implement tongue having a locking means which is engaged by pulling on the tongue and is easily releasable. The inner bar is readily adjustable to various lengths by the telescopic action so that it may be extended for connection to a pulling device.

---

This invention pertains to agricultural implements and more particularly to an adjustable tongue for an agricultural implement which can be readily adjusted manually and also shortened automatically.

Whenever an agricultural implement such as a wagon or other pulled implement is to be coupled to a farm tractor, it is necessary that the tractor be positioned very carefully so that the holes in the clevis on the implement tongue and the hole in the drawbar of the tractor will be in register so that the coupling can be inserted.

Various devices have been offered to alleviate this problem. Some of them utilized movable drawbars for the tractor. These devices were appropriate because only one was necessary for a given tractor and could be used with various implements. However, most of them were complex and expensive. Other devices for implement tongues were also more complex than necessary and therefore were not successful.

By my device I provide a simple, practical and inexpensive means to allow easy hitching of a tractor to an implement. My device can be used either on the tractor drawbar or on the implement. It provides a very simple adjustment in the length of the drawbar so that hitching of an implement to the tractor can be done easier and quicker than previously.

Figure 1:
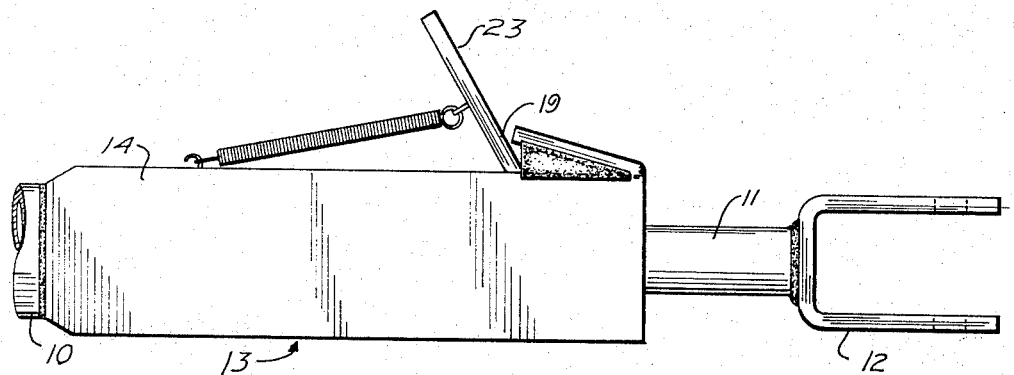
Figure 2:
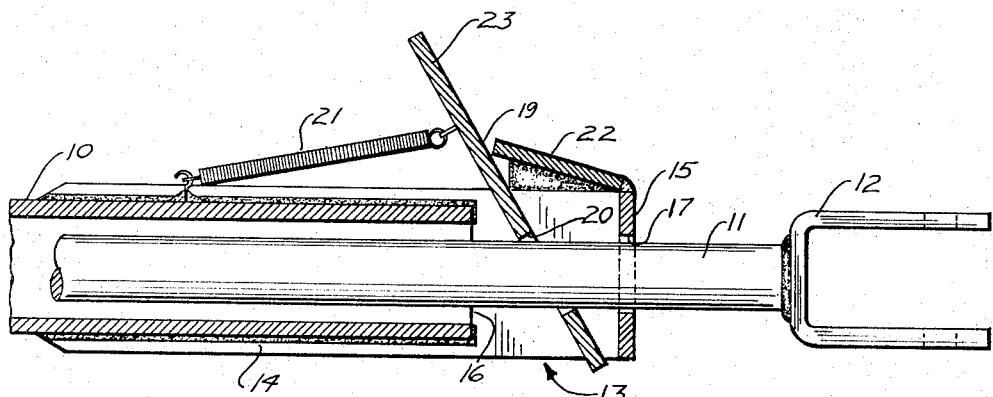

A more complete understanding of my invention in its embodiment may be had from a study of the following specification and the figures in which:

FIG. 1 is a side elevational view of my device, and
FIG. 2 is a longitudinal sectional view thereof.

Briefly my device comprises a mechanism for a wagon or implement tongue or for a tractor drawbar. The mechanism includes a telescoping tongue having a stop means to interfere with movement of the inner of the telescoping parts relative to the outer so that the parts will slide when they are pushed together, but will not slide when pulled apart unless the stop means is manually released.

More specifically and referring to the drawings, I illustrate my device as permanently mounted on a tubular tongue 10. It will later be apparent that my device might also be self-contained for connection to a tongue or a drawbar. An inner tongue or bar 11 which may be either tubular or solid is telescopically slidable within the tongue 10. On the outer end of the bar 11 is fixed an ordinary clevis 12 of the form customarily used in connecting wagons or similar devices to a tractor. It will be understood that if my device is to be used on a tractor as a drawbar, that the clevis will be replaced with a flat tongue similar to the end of a drawbar, and adapted to be disposed between the legs of the clevis.

The stop means consists of a bracket 13 having two sides 14 welded or otherwise fixed to the tongue 10 and an end 15 between the sides. The end 15 is held substantially spaced from the end 16 of the tongue as shown in FIG. 2. An opening 17 in the end 15 is provided so that the bar 11 may slide into or out of the tongue 10. A stop plate 19 having a sharp edged opening 20 is disposed around the end 16 of the bar 11 between the end of the tongue and the end 15 of the stop bracket 13. This plate is biased to tilt toward the tongue 10 by a spring 21 attached to the tongue 10. The direction in which the plate is pulled may be considered the stationary end of the device since the clevis is movable relative to the tongue.

In addition to the spring 21 which urges one end of the plate 19 to a tilted position, I provide a bumper 22 fixed to the bracket 13 by some means such as welding. This bumper is positioned so that it will engage the plate on the same side of the bar 11 as the spring 21. Thus, when pulling pressure is exerted on the bar 11 to pull it, together with the plate 19, away from the tongue, the stop plate 19 will hit the bumper 22 and be pulled against it in such a direction that the pressure exerted on the plate is toward the stationary end just as the pressure exerted by the spring.

The plate 19 is made long enough so that it extends well beyond the bumper 22 to provide a handle 23 by which it can be manipulated to slide the bar 11 manually into or out of the tongue 10 when desired.

The operation of my device is now apparent. When the tractor is stopped reasonably close to the implement, the tongue 10 is raised to approach the drawbar. The plate 19 is then moved with the handle 23 to a position where the bar 11 will slide smoothly through it in either direction. The clevis 12 is then placed over the drawbar in position where the draft pin may be dropped in place. The plate 19 can then be released. When the plate 19 is released, the spring 21 pulls it to a tilted position in which the edges of the opening 20 engage the bar 11. Further pulling on the bar 11 will cause the plate 19 to hit the bumper 22 causing additional cutting in of the edge of the opening 20 into the bar, thus providing positive pulling.

If a shorter hitch were desired, it would be necessary only to back the tractor a little. Movement between the bar and tongue, in that direction will be free since such motion tends to release the plate 19. The plate 19 easily slides over the bar 11 to the new position. Renewed pulling by the tractor again locks the device in place in pulling engagement. In the event that the hitch is not shortened by backing the tractor, there is a possibility that the bar 11 will be telescoped into the tongue at some later time because of the use of brakes on the tractor. This is not objectionable because the distance of travel would not be great and the impact would be small in each case. In any case, the renewed pulling by the tractor would automatically set the plate 19 in pulling position again so that there would be no danger of losing the towed device.

While I have described my device as a part of a tongue, it is obvious that it could be made as an independent piece suitable for attachment to a tongue or drawbar. In such a configuration, the tongue 10 would simply be a tubular member of sufficient length to accommodate the bar 11, it could be properly disposed so that the bar 11 would slide through it without interference with the tongue of the implement or the drawbar. Any mode of attaching the tongue 10 or its equivalent tubular member to the actual tongue of the implement or to the tractor drawbar could be used, provided the attachment was sufficiently strong to pull any implement to which the device might be attached.

Having thus described my invention in its embodiment I am aware that further and extensive variations may be made therefrom without departing from the spirit and scope of my invention as limited only by the following claim.

I claim:
1. Means to provide an adjustment in the length of a tongue or drawbar, comprising tubular means fixed to said tongue or drawbar, bar means slidably disposed within said tubular means and stop means affixed to said tubular means and surrounding said bar means to releasably engage said bar means and allow adjustment thereof, said stop means including a bracket fixed to said tubular means, said bracket having an end surrounding said bar means and spaced from said tubular means, manipulatable means between said tubular means and said end adapted to become positively engaged between said bumper means and said bar means to provide for positive pulling engagement therebetween and biasing means engaged between said tubular means and said manipulatable means to urge said manipulatable means into its positive engagement.

References Cited

UNITED STATES PATENTS

| | | | |
|---|---|---|---|
| 1,816,393 | 7/1931 | Morris | 280—482 |
| 2,174,063 | 9/1939 | Richards | 280—482 |
| 2,322,755 | 6/1943 | Voorhies | 280—150 |
| 2,417,871 | 3/1947 | Heuerman | 280—482 |
| 2,849,204 | 8/1958 | Petrick et al. | 287—58 X |
| 2,923,564 | 2/1960 | Brown | 287—58 |

LEO FRIAGLIA, *Primary Examiner.*